H. R. KEESE.
Harvester.
No. 23,376.
2 Sheets—Sheet 1.
Patented March 29, 1859.
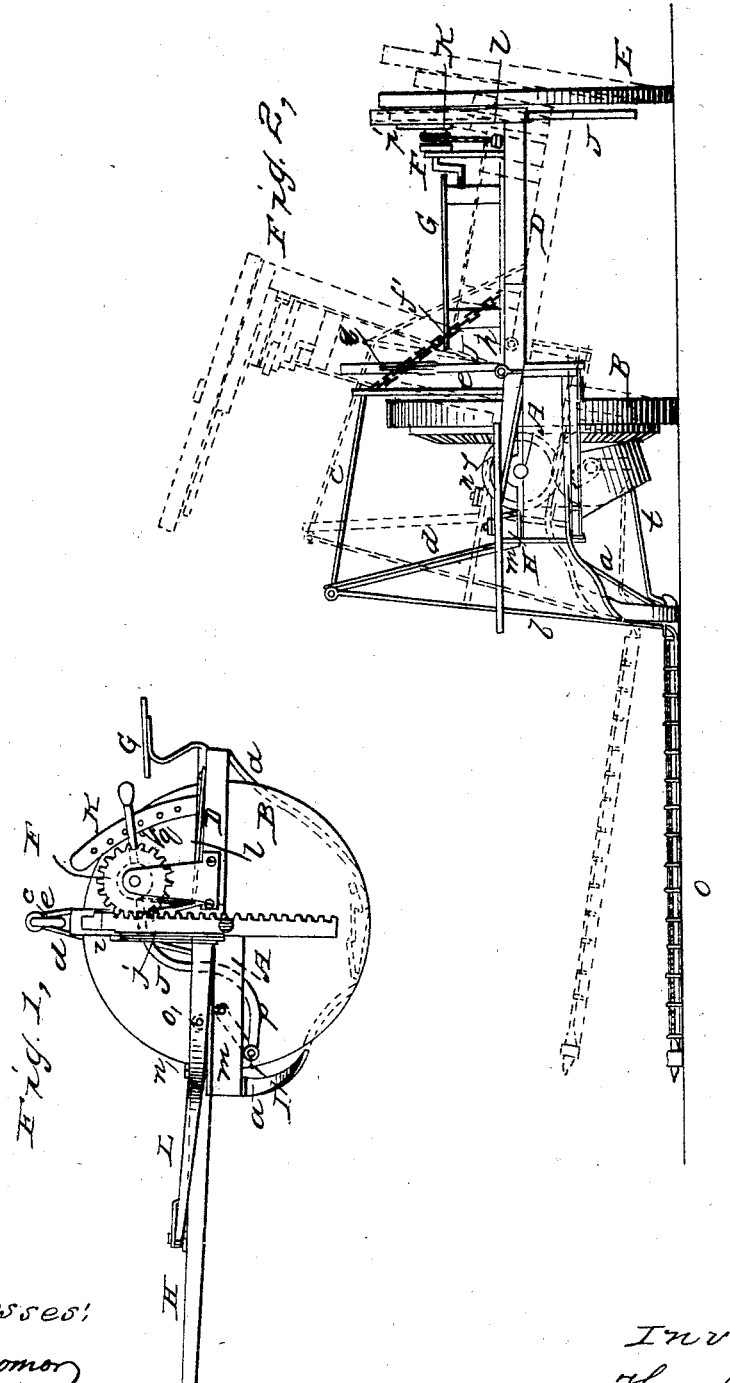

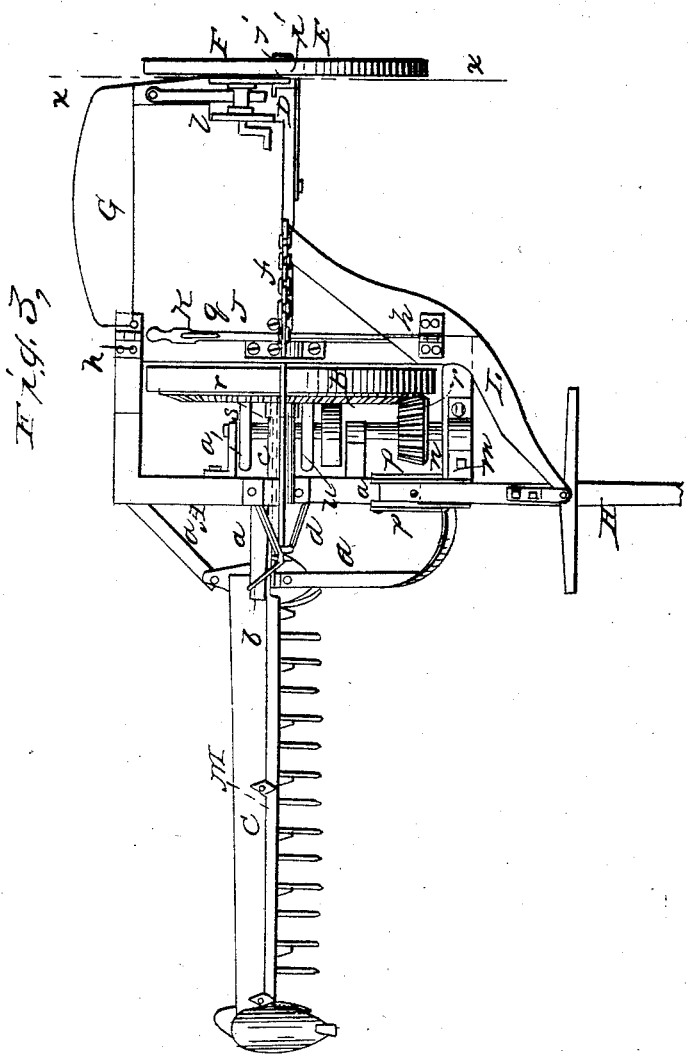

UNITED STATES PATENT OFFICE.

HENRY R. KEESE, OF BRIDPORT, VERMONT.

IMPROVEMENT IN HARVESTERS.

Specification forming part of Letters Patent No. 23,376, dated March 29, 1859.

*To all whom it may concern:*

Be it known that I, HENRY R. KEESE, of Bridport, in the county of Addison and State of Vermont, have invented certain new and useful Improvements in Grain and Grass Harvesters; and I do hereby declare that the following is a full, clear, and exact description of the same, reference being had to the annexed drawings, making a part of this specification, in which—

Figure 1 is a vertical section of a harvester constructed according to my invention and taken in the line $x\ x$, Fig. 3. Fig. 2 is a front view of the same; Fig. 3, a plan or top view of the same.

Similar letters of reference indicate corresponding parts in the several figures.

To enable those skilled in the art to fully understand and construct my invention, I will proceed to describe it.

A represents the main frame of the machine, said frame being of rectangular form and having the driving-wheel B placed within it. C is the finger-bar, which is attached to the main frame A by means of curved bars $a$, arranged in any suitable way. The finger-bar C and main frame A are braced by rods $b\ c\ d\ e$ and a chain, $f$, all of which are shown clearly in Fig. 2. The rod $b$, it will be seen by referring to said figure, is connected to the inner part of the finger-bar C, the upper end of said rod being attached to a rod, $c$, which is supported by the rod $d$ from the frame A. The rod $c$ extends across the main frame A and over the driving-wheel B, and is fitted in the rod $e$, which is also attached to the frame A. To the inner end of the rod $c$ the chain $f$ is attached, said chain being secured to a supplemental frame, D, which is attached to the main frame A by hinges $h\ h$, both of which are shown in Fig. 3.

To the outer end of the supplemental frame D a vertical quadrilateral tube, $i$, is attached, in which a rack, $j$, is fitted, said rack being attached to a wheel, E. On the frame D a pinion, F, is placed, and this pinion gears into the rack $j$. To the axis of the pinion F a chain, $k$, is attached, and this chain is connected to a spring, $l$, on the supplemental frame D.

On the frame D the driver's seat G is placed. This seat extends the whole width of the frame D, as shown clearly in Figs. 2 and 3.

To the front part of the main frame A the draft-pole H is attached by a pin or bolt, $m$, which passes horizontally through a socket, $n$, on the frame A. To the back end of the draft-pole H a link, $o$, is attached, and this link connects the back end of the draft-pole with arms $p\ p$, which are attached to a shaft, I, placed underneath the front part of the main frame A. To the inner end of the shaft I a lever, J, is attached, said lever extending back as far as the driver's seat, slotted at its back end, and fitted over a curved perforated bar, K, through either of the perforations of which a pin or pins, $q$, pass, in order to retain the lever J at any desired height.

The draft-pole H is connected with the supplemental frame D by a brace, L, which is of course jointed, one of the hinges, $h$, serving as a joint, as shown clearly in Fig. 3.

The sickle M is driven from the wheel B by gearing $r$, crank $s$, and pitman $t$, two fly-wheels, $u\ u$, being placed on the crank-shaft.

The operation is as follows: The driver, when on the seat G, balances by his gravity the whole machine on the driving-wheel B, the side on which the finger-bar C is placed slightly preponderating, in order that it may cut closely and run lightly on the grass, not bearing sufficiently on the ground to create any appreciable amount of friction, and as the seat G extends the whole width of the supplemental frame D, the driver, by shifting his body lightly, can elevate the finger-bar C, as shown in red, Fig. 2, above all obstructions. In fact, the finger-bar will be under the complete control of the driver. In case of turning the machine, the driver, by shifting his position quite near the outer part of the seat G near the wheel E, will tilt the machine materially, so as to elevate the finger-bar and cause the machine to turn within a very small compass. The driver, however, without shifting his position, may obtain the same result by turning the pinion F, and a pawl may, if desired, be attached to the supplemental frame D, in order to retain the pinion F and control the tilting of the machine—that is to say, determine its length of vibration—and also prevent the machine from entirely tilting in case the team should become restive and require the undivided attention of the driver. The weight or gravity of the driver also relieves the team of the pressure of the draft-pole; in fact, the whole machine may be balanced on the wheel B, thereby entirely obviating side draft, as the finger-bar need not touch the ground or bear but slightly upon it.

I would remark that I design to have the finger-bar C preponderate in weight about twenty pounds, which is equivalent to the spring *l*. This slight preponderance of weight of the finger-bar will throw the yielding or vibrations consequent on the movement of the machine principally on the wheel E, and cause the finger-bar to remain in proper cutting position and not be deflected or moved by slight disturbing causes. In consequence of throwing the whole weight of the machine on the wheel B, said wheel may be made much lighter than usual and still be perfectly efficient. In ordinary machines the driving-wheels require to be comparatively heavy in order to avoid slipping, and the draft of the machines are of course proportionably increased. By my improvement, therefore, this difficulty is obviated. The wheel E also may be quite light, as it is not required to sustain much weight. By having the finger-bar C and main frame A braced by the rods *b c d e* and the chain *f* all torsional strain to which the main frame A would be otherwise liable in consequence of the raising of the finger-bar C is avoided.

By having the supplemental frame D hinged to the main frame A the frame D may be elevated, as shown by the dotted lines in Fig. 2, and the machine allowed to pass readily between bar-posts or through gates.

The driver, by adjusting the lever J, may elevate the front ends of the fingers of the finger-bar C, so that said fingers will not catch against slight obstructions, but will be allowed to pass over them.

It will be seen that the raising of the outer end of the lever J will actuate the arms *p p*, and that the latter, in consequence of being connected to the back end of the draft-pole H by the link *o*, will throw up the front end of the main frame A, and consequently the front ends of the fingers of the bar C, thereby allowing said fingers to pass over slight obstructions, or preventing them from catching against them, so that the finger-bar may rise and pass freely over.

Having thus described my invention, what I claim as new, and desire to secure by Letters Patent, is—

1. The employment of a hinged supplemental frame, D, in combination with the main frame A and driving-wheel B, when the said frame D is provided with an adjustable bearing-wheel, E, or its equivalent, all substantially as and for the purpose herein shown and described.

2. The combination of a driver's seat, G, with the supplemental frame D and driving-wheel B, as set forth, so that by lateral change of his position the driver may elevate or depress the cutters, increase or diminish the traction, and otherwise balance and govern the machine, all as herein shown and described.

3. Hinging the supplemental frame D to the main frame A, substantially as and for the purpose set forth.

HENRY R. KEESE.

Witnesses:
    W. TUSCH,
    W. HAUFF.